(12) United States Patent
Ebisumoto et al.

(10) Patent No.: US 11,326,654 B2
(45) Date of Patent: May 10, 2022

(54) FRICTION ENGAGEMENT ELEMENT CONTROL SYSTEM AND METHOD OF CONTROLLING FRICTION ENGAGEMENT ELEMENT

(71) Applicant: Mazda Motor Corporation, Hiroshima (JP)

(72) Inventors: Hirofumi Ebisumoto, Aki-gun (JP); Nobuhide Seo, Aki-gun (JP); Tsukasa Sori, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/153,378

(22) Filed: Jan. 20, 2021

(65) Prior Publication Data
US 2021/0254672 A1    Aug. 19, 2021

(30) Foreign Application Priority Data
Feb. 14, 2020 (JP) .............................. JP2020-023531

(51) Int. Cl.
*F16D 25/063* (2006.01)
*F16D 48/02* (2006.01)
(Continued)

(52) U.S. Cl.
CPC ......... *F16D 25/14* (2013.01); *F16D 25/0638* (2013.01); *F16D 2121/04* (2013.01);
(Continued)

(58) Field of Classification Search
CPC .. F16D 25/14; F16D 25/0638; F16D 2121/04; F16D 2300/18;
(Continued)

(56) References Cited

U.S. PATENT DOCUMENTS

| 3,390,750 A | * | 7/1968 | Albertson | F16D 69/026 |
| | | | | 192/107 M |
| 2002/0148700 A1 | * | 10/2002 | Dominke | F16D 48/066 |
| | | | | 192/85.63 |

(Continued)

FOREIGN PATENT DOCUMENTS

| JP | 2011190864 A | | 9/2011 | | |
| KR | 20180067263 A | * | 6/2018 | ............ | G01M 3/025 |

*Primary Examiner* — Stacey A Fluhart
(74) *Attorney, Agent, or Firm* — Alleman Hall Creasman & Tuttle LLP

(57) ABSTRACT

A friction engagement element control system is provided, which includes a friction engagement element including friction plates, which are an input-side friction plate and an output-side friction plate, and an actuation system configured to engage the input-side friction plate with the output-side friction plate with a pushing force, the friction plates having a characteristic in which a friction coefficient thereof decreases as a rotational difference between the friction plates increases. The device includes a controller configured to control the pushing force so that the negative slope characteristic becomes a positive slope characteristic in which a frictional force of the friction engagement element decreases as the rotational difference decreases, when engaging the friction engagement element.

20 Claims, 9 Drawing Sheets

(51) Int. Cl.
*F16D 25/0638* (2006.01)
*F16D 121/04* (2012.01)

(52) U.S. Cl.
CPC .. *F16D 2300/18* (2013.01); *F16D 2500/1045* (2013.01); *F16D 2500/10412* (2013.01); *F16D 2500/1107* (2013.01); *F16D 2500/30415* (2013.01); *F16D 2500/30426* (2013.01); *F16D 2500/50236* (2013.01)

(58) Field of Classification Search
CPC ... F16D 2500/10412; F16D 2500/1045; F16D 2500/1107; F16D 2500/30415; F16D 2500/30426; F16D 2500/50236
See application file for complete search history.

(56) References Cited

U.S. PATENT DOCUMENTS

| | | | | |
|---|---|---|---|---|
| 2003/0006074 A1* | 1/2003 | Ishikawa | ............... | F16D 43/284 |
| | | | | 180/19.1 |
| 2008/0312038 A1* | 12/2008 | Nakagawa | ............ | F16D 48/062 |
| | | | | 477/175 |
| 2015/0308521 A1* | 10/2015 | Smith | .................... | F16D 48/06 |
| | | | | 701/68 |

* cited by examiner

|  | LOW CLUTCH (40) | HIGH CLUTCH (50) | LR BRAKE (60) | 26 BRAKE (70) | R35 BRAKE (80) |
|---|---|---|---|---|---|
| 1ST GEAR | O |  | O |  |  |
| 2ND GEAR | O |  |  | O |  |
| 3RD GEAR | O |  |  |  | O |
| 4TH GEAR | O | O |  |  |  |
| 5TH GEAR |  | O |  |  | O |
| 6TH GEAR |  | O |  | O |  |
| REVERSE GEAR |  |  | O |  | O |

FRICTION ENGAGEMENT ELEMENT CONTROL SYSTEM AND METHOD OF CONTROLLING FRICTION ENGAGEMENT ELEMENT

TECHNICAL FIELD

The present disclosure relates to a friction engagement element control system mounted on a vehicle, such as an automobile.

BACKGROUND OF THE DISCLOSURE

Automatic transmissions mounted on vehicles, such as automobiles, switch a power transmission path (comprised of a planetary gear set, etc.) by selectively engaging a plurality of friction engagement elements (comprised of a clutch, a brake, etc.) to achieve a given gear stage according to the operating state of the vehicle.

Such friction engagement elements include input-side friction plates, output-side friction plates, and pushing force generation means for engaging these friction plates. As the pushing force generation means, a hydraulic piston which operates a piston by hydraulic pressure supplied from an oil pump, and an electric motor type piston which moves a piston inside a cylinder by an electric motor to generate hydraulic pressure, are known. Moreover, as the friction engagement elements mounted on the vehicle, for example, an electromagnetic clutch for a four-wheel drive vehicle in which a pushing force is generated by an electromagnetic force without using the hydraulic pressure, is known.

When the friction engagement elements transition from a disengaged state to an engaged state, a frictional force (engaging force) between the input-side friction plates and the output-side friction plates is increased by the pushing force generation means. The friction engagement elements are fully engaged when a rotational difference between both the friction plates decreases and then becomes zero. While the friction engagement elements transition from the disengaged state to the engaged state, judder vibration (a stick-slip phenomenon) which is caused by a variation in the engaging force may occur. Since the engaging force is a product of a friction coefficient of the friction material and the pushing force, the judder vibration occurs due to a change in a friction coefficient of the friction engagement elements, a variation in hydraulic pressure, etc.

When the friction coefficient as the cause of the judder vibration is considered, a friction coefficient $\mu$ of the friction engagement elements has such a characteristic that it varies according to a change in a rotational difference V between the friction engagement elements. In more detail, the friction plates used for the friction engagement elements generally have a positive-slope characteristic in which the friction coefficient $\mu$ increases with the increase at the rotational difference V (a $\mu$-V characteristic has a positive slope), or a negative-slope characteristic in which the friction coefficient $\mu$ decreases with the increase at the rotational difference V (the $\mu$-V characteristic has a negative slope).

JP2011-190864A discloses a friction material having the positive-slope characteristic which is generally used as the friction material for the friction engagement elements.

The change in the friction coefficient $\mu$ relative to the rotational difference V when the friction engagement element having the positive-slope characteristic transitions from the disengaged state to the engaged state is described with reference to FIG. 9. Here, a starting point of the transition is P1, and the rotational difference, the friction coefficient, and the time at P1 are N1, $\mu$1, and t1, respectively. In addition, in order to facilitate an easier understanding, the rotational difference at P2 where the time progresses a minute time $\Delta$t from t1 (hereinafter, t1+$\Delta$t), when the slope of the $\mu$-V characteristic is zero (the $\mu$-V characteristic has a zero slope), is first considered, and it is set as N2. Here, considering a case where the $\mu$-V characteristic has the positive slope, the friction coefficient $\mu$ at the rotational difference N2 is $\mu$2, and it is smaller than $\mu$1.

Therefore, since the total of the frictional forces which brakes the rotational difference during $\Delta$t becomes smaller when the $\mu$-V slope is positive than when the $\mu$-V characteristic has the zero slope, the rotational difference at t1+$\Delta$t becomes N3 which is slightly higher than N2. Here, since it is certain that N3 is somewhere between N1 and N2, the rotational difference at t1+$\Delta$t (denoted as P3) can be determined uniquely and stably. Thus, the transitions of the rotational difference V and the friction coefficient $\mu$ relative to time when the $\mu$-V characteristic has the positive slope are determined, and by repeating this operation, a full engagement (the rotational difference=0) is achieved stably.

Meanwhile, in order to improve fuel efficiency, a reduction of drive energy of the pushing force generation means (e.g., the load of the engine which drives a mechanical oil pump) is demanded. As described above, since the engaging force is a product of the friction coefficient and the pushing force, the friction coefficient may be increased in order to reduce the hydraulic pressure while securing a transmission torque capacity.

However, generally, when the friction coefficient $\mu$ of the friction plates is increased, the $\mu$-V characteristic turns into the negative slope from the positive slope, as illustrated in FIG. 10. This change in the friction coefficient $\mu$ relative to the rotational difference V when the friction engagement elements having the $\mu$-V characteristic of the negative slope transitions from the disengaged state to the engaged state is described with reference in FIG. 10. Here, the starting point of the transition is P11, and the rotational difference, the friction coefficient, and the time at P11 are N11, $\mu$11, and t11, respectively. Then, similarly to the case of the $\mu$-V characteristic being the positive slope, the rotational difference at t11+$\Delta$t when the $\mu$-V characteristic has the zero slope is first considered, and it is set as N12.

Here, when the case where the $\mu$-V characteristic has the negative slope is considered, the friction coefficient $\mu$ at the rotational difference N12 is $\mu$12, and it is larger than $\mu$11. Therefore, since the total of the frictional forces which brakes the rotation becomes larger during $\Delta$t when the $\mu$-V characteristic has the negative slope than when the $\mu$-V characteristic has the zero slope, the rotational difference P12 at the t11+$\Delta$t becomes slightly lower than N12.

Thus, considering the total of the frictional forces which brakes the rotational difference during $\Delta$t while the rotational difference at t11+$\Delta$t is now set as N13, since the total of frictional forces becomes further larger than the case where it changes from N11 to N13, the rotational difference at t11+$\Delta$t becomes further lower than N13. Thus, when the $\mu$-V characteristic is the negative slope, a rapid, instant decrease in the rotational difference V occurs due to the decrease in the rotational difference V and the increase in the friction coefficient $\mu$ forming a positive feedback arrangement and amplifying each other.

This rapid decrease in the rotational difference V causes torsion (elastic deformation) in metal shafts connected to both ends of the friction engagement elements, and the friction engagement elements slip suddenly at the moment (P14) an elastic force accumulated in the metal shafts by the torsion exceeds the transmission torque capacity which is transmittable by the friction engagement elements. That is, the rotational difference of the friction engagement elements increases rapidly (P15), and the metal shafts return to the original state where there is no torsion. From this state, the rotational difference again begins the rapid decrease similar to the above, and the judder vibration occurs by repeating this procedure.

SUMMARY OF THE DISCLOSURE

Therefore, the present disclosure is made in view of the problem described above, and one purpose thereof is to provide a friction engagement element control system, which can achieve both an improvement in fuel efficiency by a reduction of a pushing force of friction engagement elements, and a reduction of judder vibration.

The present inventors examined various aspects about a reduction of the judder vibration when the friction engagement elements using friction plates with a high friction coefficient having the µ-V characteristic of the negative slope are engaged. As described above, it is conventionally known about whether the judder vibration occurs or not according to the µ-V characteristic being the positive slope or the negative slope. The present inventors discovered that, even if the µ-V characteristic has the negative slope, the occurrence of the judder vibration can be suppressed by turning a characteristic formula (hereinafter, referred to as the "F-V characteristic formula") into the positive slope. Here, the F-V characteristic formula indicates a relationship between the frictional force F and the rotational difference V of the friction engagement elements, which can be obtained by multiplying the friction coefficient µ of the µ-V characteristic formula by the pushing force P for engaging the friction engagement elements. The present inventors proved this by performing simulations, and therefore, completed the present disclosure.

According to one aspect of the present disclosure, a friction engagement element control system is provided, which includes a friction engagement element including friction plates, which are an input-side friction plate and an output-side friction plate, and an actuation system configured to engage the input-side friction plate with the output-side friction plate with a pushing force, the friction plates having a negative slope characteristic in which a friction coefficient thereof decreases as a rotational difference between the friction plates increases, and a controller configured to control the pushing force so that the negative slope characteristic becomes a positive slope characteristic in which a frictional force of the friction engagement element decreases as the rotational difference decreases, when engaging the friction engagement element.

According to this configuration, by using the friction plates with the high friction coefficient having the µ-V characteristic of the negative slope in which the friction coefficient µ decreases as the rotational difference V increases, the pushing force of the friction engagement element can be reduced. Therefore, the drive energy for driving the actuation system can be reduced, thereby improving fuel efficiency and downsizing drive sources.

Since the controller controls the pushing force of the friction engagement element so as to have the positive-slope characteristic in which the frictional force decreases as the rotational difference of the friction engagement element decreases when engaging the friction engagement element, the judder vibration can be suppressed even when the friction material of which the µ-V characteristic of the friction coefficient is the negative slope is used.

As described above, in the friction engagement element control system, both the improvement in fuel efficiency by the reduction of the pushing force of the friction engagement element and the reduction of judder vibration can be achieved.

The actuation system may include a piston, an oil pump, and a control valve configured to control hydraulic pressure supplied to the piston from the oil pump.

According to this configuration, for example, when the friction engagement element control system is used for an automatic transmission, both the improvement in fuel efficiency by the reduction of the pushing force of the friction engagement element and the reduction of judder vibration can be achieved, without changing the conventional configuration of the friction engagement element provided with a control valve which controls the hydraulic pressure supplied to the piston from the oil pump.

Meanwhile, since the frequency of the judder vibration is generally in the level of several tens of hertz, in order to reduce judder vibration, the speed of response of actuation system is required to be higher than the frequency of the judder vibration. That is, a period of time after the actuation system receives a given hydraulic pressure supply command from the controller until the hydraulic pressure is controlled to reach a given value and the piston presses the friction plates, is required to be shortened.

In this regard, the actuation system may include a piston, a hydraulic cylinder configured to supply hydraulic pressure to the piston, and an electric motor configured to operate the hydraulic cylinder.

According to this configuration in which the hydraulic cylinder configured to supply the hydraulic pressure to the piston is operated by the electric motor, the speed of response of the friction engagement element can be improved as compared with the conventional configuration of the friction engagement element provided with a control valve which controls the hydraulic pressure supplied to the piston from an oil pump. Therefore, the pushing force control can be performed at a sufficiently higher speed of response than the frequency of the judder vibration (about 10 Hz to about 20 Hz), for example, with the speed of response as about 100 Hz, and the judder vibration may be suppressed effectively.

The friction engagement element control system may constitute an automatic transmission. The automatic transmission may include an input member coupled to the input-side friction plate, an output member coupled to the output-side friction plate, an input rotating speed sensor configured to detect a rotating speed of the input member, and an output rotating speed sensor configured to detect a rotating speed of the output member. The controller may calculate the rotational difference by converting the input rotating speed detected by the input rotating speed sensor and the output rotating speed detected by the output rotating speed sensor.

According to this configuration, the rotational difference of the friction engagement element is calculated based on the rotating speeds of the input member of the automatic transmission and the output member of the automatic transmission, and the gear ratio of the friction engagement element. Therefore, it is not necessary, for obtaining the rotational difference, to be provided with a sensor for detecting a rotating speed of each of the input-side friction plate and the output-side friction plate of each friction engagement element (or rotating members with which both the friction plates engage).

The controller may correct the pushing force according to the rotational difference.

According to this configuration, since the controller corrects the pushing force for controlling the engaging force (frictional force) according to the rotational difference, it can control the engaging force (frictional force) relative to the rotational difference so as to become the positive slope.

The controller may control the pushing force from a start of the engagement of the friction engagement element to an end of the engagement.

According to this configuration, since the controller performs the control during the period from the engagement start of the friction engagement element to the end of engagement, the judder vibration during the transition from the disengaged state to the engaged state can be suppressed effectively.

According to one aspect of the present disclosure, a method of controlling a friction engagement element is provided, the friction engagement element including friction plates, which are an input-side friction plate and an output-side friction plate, and an actuation system configured to engage the input-side friction plate with the output-side friction plate with a pushing force, the friction plates having a negative slope characteristic in which a friction coefficient thereof decreases as a rotational difference between the friction plates increases. The method includes controlling the pushing force so that the negative slope characteristic becomes a positive slope characteristic in which a frictional force of the friction engagement element decreases as the rotational difference elements decreases, when engaging the friction engagement element.

Also according to this configuration, the effect described above can be achieved.

DETAILED DESCRIPTION OF THE DISCLOSURE

Hereinafter, one embodiment in which the present disclosure is applied to an automatic transmission is described with reference to the accompanying drawings.

Figures 1, 2:
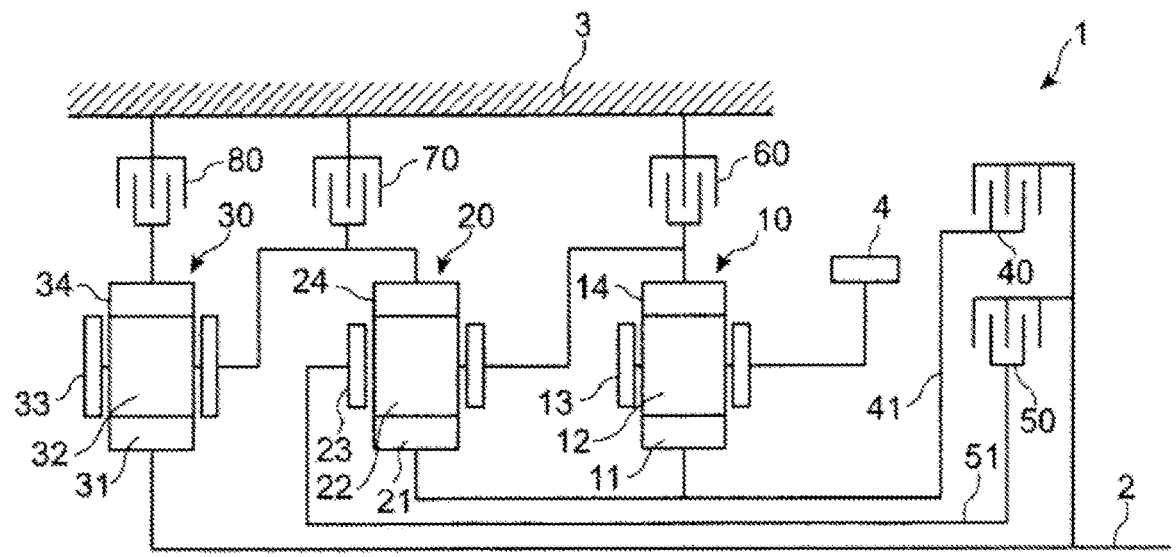
FIG. 1 is a view schematically illustrating an automatic transmission provided with a control device as a friction engagement element control system according to one embodiment of the present disclosure.
FIG. 2 is an engagement table illustrating a relationship between a combination of engagement of the friction engagement elements and a gear stage of this automatic transmission.

FIG. 1 is a view schematically illustrating a configuration of the automatic transmission as a friction engagement element control system according to this embodiment of the present disclosure. This automatic transmission 1 has an input shaft 2 as an input member of the automatic transmission 1 into which engine output is inputted through a torque converter (not illustrated). On this input shaft 2, first, second, and third planetary gear sets (hereinafter, referred to as the "first, second, and third gear sets") 10, 20, and 30 are disposed from the drive-source side (right side in this drawing).

On the input shaft 2, as friction engagement elements for switching a power transmission path comprised of the first to third gear sets 10, 20, and 30, a low clutch 40 and a high clutch 50 which selectively transmit power from the input shaft 2 to the gear sets 10, 20, and 30 side, an LR (low reverse) brake 60, a 26 brake 70, and an R35 brake 80 which fix given rotating elements of the gear sets 10, 20, and 30 are disposed in this order from the drive-source side.

The first, second, and third gear sets 10, 20, and 30 are comprised of sun gears 11, 21, and 31, a plurality of pinions 12, 22, and 32 which mesh with the sun gears 11, 21, and 31, carriers 13, 23, and 33 which support the pinions 12, 22, and 32, and ring gears 14, 24, and 34 which mesh with the pinions 12, 22, and 32, respectively.

Further, the sun gear 11 of the first gear set 10 and the sun gear 21 of the second gear set 20 are combined, and they are coupled to an inner rotating member 41 of the low clutch 40. Moreover, an inner rotating member 51 of the high clutch 50 is coupled to the carrier 23 of the second gear set 20. Moreover, the input shaft 2 is directly coupled to the sun gear 31 of the third gear set 30.

Moreover, the ring gear 14 of the first gear set 10 and the carrier 23 of the second gear set 20 are combined, and the LR brake 60 is disposed between these and a transmission case 3. Moreover, the ring gear 24 of the second gear set 20 and the carrier 33 of the third gear set 30 are combined, the 26 brake 70 is disposed between these components and the transmission case 3, and the R35 brake 80 is disposed between the ring gear 34 of the third gear set 30 and the transmission case 3. An output gear 4 as an output member of the automatic transmission 1 which outputs the output of the automatic transmission 1 to the driving-wheel (not illustrated) side is coupled to the carrier 13 of the first gear set 10.

By the above configuration, this automatic transmission 1 selectively uses the combination of the engaged state of the low clutch 40, the high clutch 50, the LR brake 60, the 26 brake 70, and the R35 brake 80 to form first to sixth gears in a D-range and a reverse gear in an R-range, as illustrated in FIG. 2.

Each of the friction engagement elements 40, 50, 60, 70, and 80 includes a plurality of inner friction plates disposed inside, outer friction plates disposed outside the plurality of inner friction plates, a piston which engages the plurality of friction plates, and an engagement hydraulic pressure chamber to which engagement hydraulic pressure for pressing the piston to the friction-plates side is supplied. One of the inner friction plate(s) and the outer friction plate(s) becomes an input-side friction plate and the other becomes an output-side friction plate, according to a power transmission state.

Figure 3:
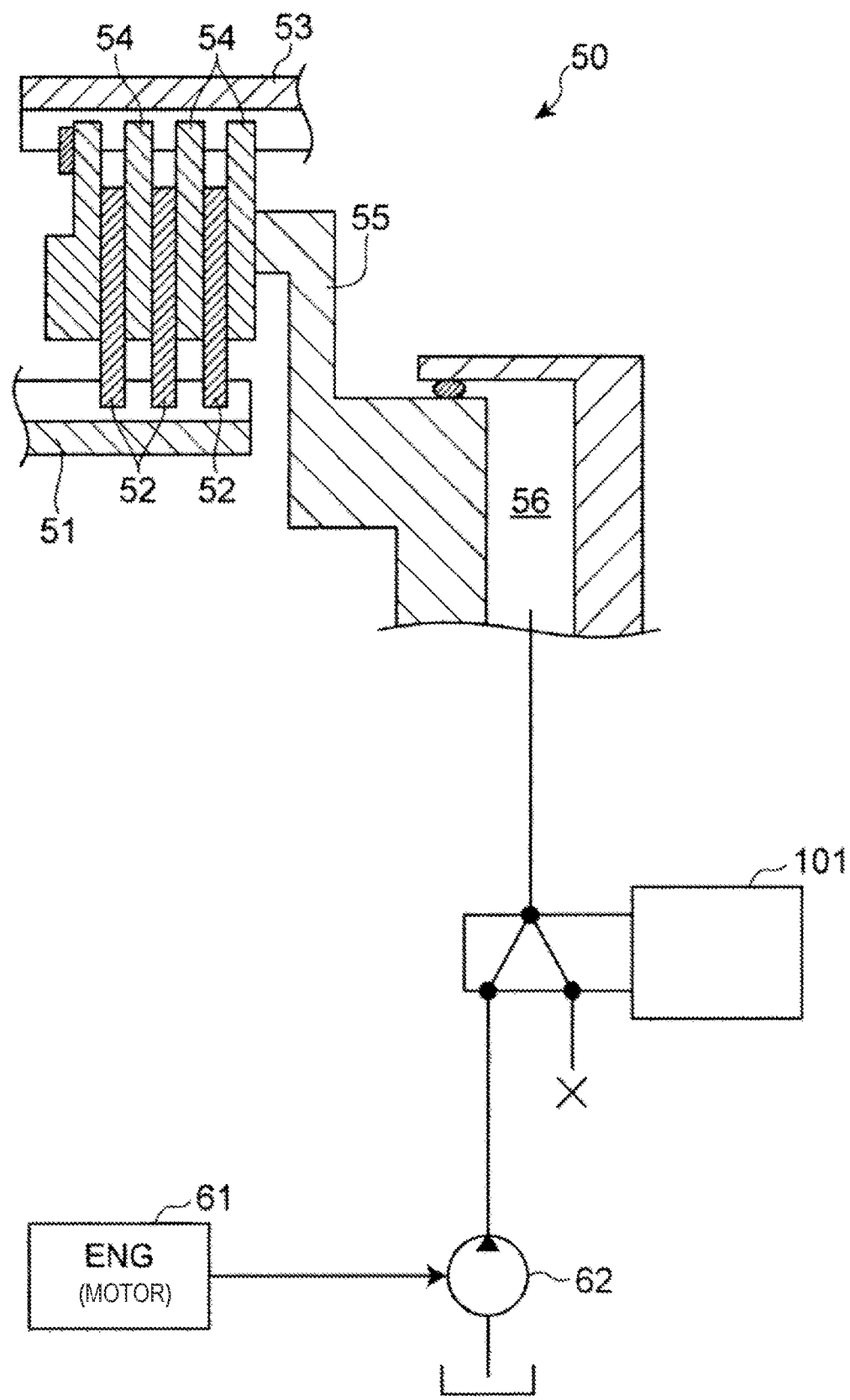
FIG. 3 is a circuit diagram illustrating a part of a hydraulic circuit of this automatic transmission.

Here, the high clutch 50 is described with reference in FIG. 3, as one example of a part of a hydraulic circuit 100 which controls the engagement/disengagement of the friction engagement elements 40, 50, 60, 70, and 80.

The high clutch 50 includes at least one inner friction plate 52 which is engaged with an outer circumferential surface of a cylindrical part of the inner rotating member 51, at least one outer friction plate 54 which is engaged with an outer circumferential surface of a cylindrical part of an outer rotating member 53, and a piston 55 which presses the inner friction plate(s) 52 and the outer friction plate(s) 54.

The inner friction plate 52 and the outer friction plate 54 are disposed alternately in the axial direction. The piston 55 is disposed so as to be rotatable on the axial center of the input shaft 2 and slidable in the axial direction. The piston 55 slides in the axial direction to press the inner friction plate 52 and the outer friction plate 54 in the axial direction so that the plates are engaged with each other. The slide of the piston 55 is controlled by feeding and discharging hydraulic fluid to/from an engagement hydraulic pressure chamber 56.

A solenoid valve 101 is connected to the engagement hydraulic pressure chamber 56 as a control valve which constitutes a part of the hydraulic circuit 100 for controlling feeding and discharging of hydraulic fluid to/from the engagement hydraulic pressure chamber 56. A line hydraulic pressure which is adjusted to an engagement hydraulic pressure according to a command signal from a control device 200 described later (see FIG. 4) is supplied to the hydraulic pressure chamber 56 through the solenoid valve 101. The line pressure is obtained by adjusting the hydraulic pressure (original hydraulic pressure) generated by a mechanical oil pump 62 which is rotated by an engine 61 to the pressure according to the accelerator opening, the engine load, etc.

Note that although the oil pump 62 (mechanical pump) is driven by the engine as a drive source, the oil pump may be driven by a motor (i.e., an electric pump). Moreover, the piston 55, the oil pump 62, and the solenoid valve 101 which controls the hydraulic pressure supplied from the oil pump 62 to the piston 55 constitute one example of an "actuation system" in the present disclosure.

Figure 4:
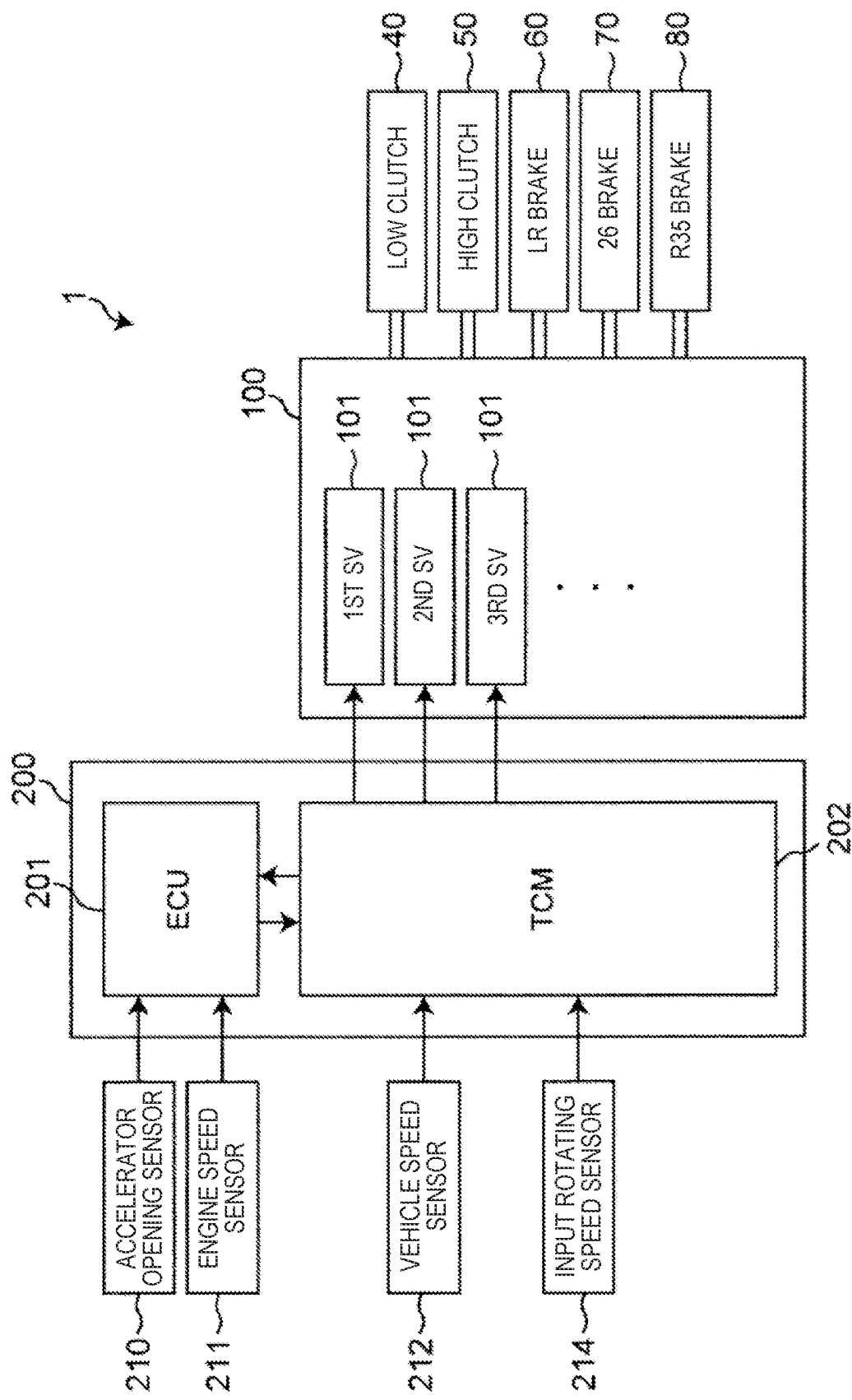
FIG. 4 is a diagram illustrating the friction engagement element control system.

As illustrated in FIG. 4, the automatic transmission 1 is provided with the hydraulic circuit 100 for selectively supplying the engagement line pressure to the friction engagement elements 40, 50, 60, 70, and 80 to achieve the gear stages as described above. This hydraulic circuit 100 is provided with a plurality of solenoid valves 101 for a transmission control (hereinafter, the "solenoid valve" may be referred to as "SV").

The plurality of solenoid valves 101 of the hydraulic circuit 100 are controlled by the control device 200. The control device 200 includes an ECU (Engine Control Unit) 201 mounted on the engine, and a TCM (Transmission Control Unit) 202 mounted on the automatic transmission 1. The ECU 201 and the TCM 202 are electrically connected to each other, for example, through CANBUS communication.

Signals from an accelerator opening sensor 210 which detects a stepping amount of an accelerator pedal (accelerator opening) as a demanded acceleration amount to the vehicle, and an engine speed sensor 211 which detects an engine speed are inputted into the ECU 201. The ECU 201 performs various controls relevant to operation of the engine, such as a control of the output torque of the engine based on the input signals.

A signal from a vehicle speed sensor 212 which detects a traveling speed of the vehicle, a signal from an input-shaft rotating speed sensor 214 to the transmission, and a signal from the vehicle speed sensor 212 as an output-shaft rotating speed sensor are inputted into the TCM 202. Moreover, a signal from the accelerator opening sensor 210 and a signal from the engine speed sensor 211 are inputted into the TCM 202 via the ECU 201.

Based on these input signals, the TCM 202 outputs a signal to each solenoid valve 101 of the hydraulic circuit 100. Thus, the transmission control of the automatic transmission 1 is performed by controlling opening/closing or the opening of each solenoid valve 101 according to the selected range and the traveling state of the vehicle, and controlling the hydraulic pressure supply to each of the friction engagement elements 40, 50, 60, 70, and 80. Moreover, the TCM 202 outputs, to the ECU 201, various command signals relevant to the engine operation, such as the engine output torque, corresponding to the situation of the transmission control. Note that other signals from various instruments, such as an oil temperature sensor which detects temperature of hydraulic fluid may be inputted into the ECU 201.

For the transmission control, a so-called "transmission chart" using the vehicle speed and the accelerator opening as parameters, which defines conditions of a gear change for each transmission pattern (upshift conditions and downshift conditions). When the vehicle speed detected by the vehicle speed sensor 212 and the accelerator opening detected by the accelerator opening sensor 210 satisfy the gear-change condition, an upshift or a downshift is performed.

A control for hydraulic pressure supplied to the engagement hydraulic pressure chamber of the automatic transmission 1 is performed by a pushing force control (described below). The control of the hydraulic pressure supplied to the engagement hydraulic pressure chamber is performed by controlling the flow and the hydraulic pressure of hydraulic fluid supplied to the hydraulic circuit 100 from the oil pump 62 (see FIG. 3) by using a hydraulic control valve, a directional control valve, etc. which are provided to the hydraulic circuit 100.

Thus, each of the friction engagement elements 40, 50, 60, 70, and 80 is engaged when the hydraulic fluid is supplied to the engagement hydraulic pressure chamber of the friction engagement element, and is disengaged when the hydraulic fluid is discharged from the engagement hydraulic pressure chamber. Moreover, by controlling the hydraulic pressure of the engagement hydraulic pressure chamber of each of the friction engagement elements 40, 50, 60, 70, and 80, the engagement, disengagement, the slip, and a degree of the engagement (engagement ratio) in the slip condition of the friction engagement element are controlled.

Figure 10:
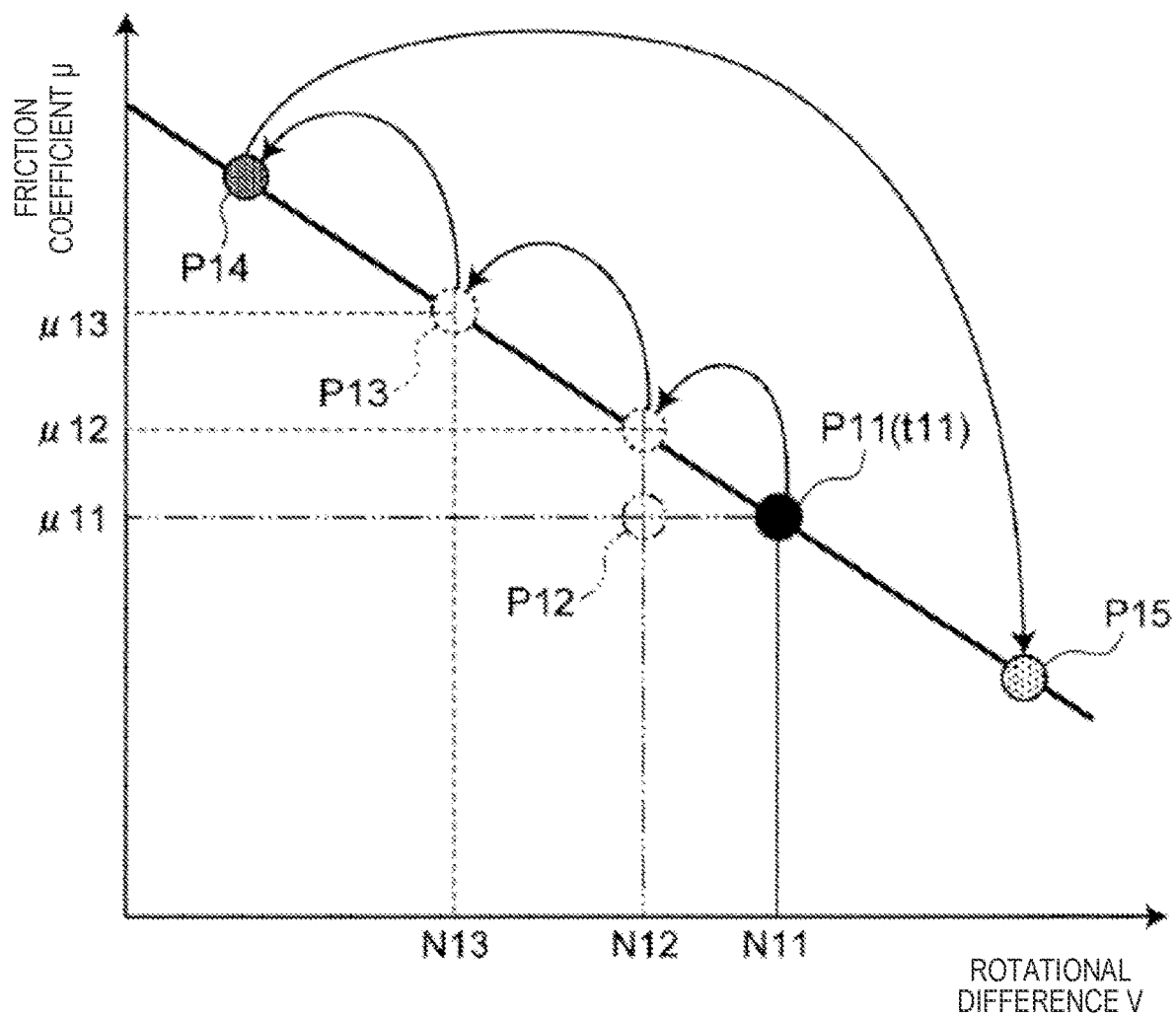
FIG. 10 is a graph illustrating the judder vibration when engaging the friction engagement elements of the μ-V characteristic of a negative slope.

Meanwhile, as illustrated in FIG. 10, friction plates with high friction coefficient are used for each of the friction engagement elements 40, 50, 60, 70, and 80 in this embodiment. Therefore, each of the friction engagement elements 40, 50, 60, 70, and 80 has a so-called "$\mu$-V characteristic of a negative slope" in which the friction coefficient $\mu$ decreases as the rotational difference V increases. In other words, a slope $\Delta\mu/\Delta V$ of $\Delta\mu$ which is an amount of change in the friction coefficient $\mu$ of each of the friction engagement elements 40, 50, 60, 70, and 80 relative to an amount of change $\Delta V$ in the rotational differential speed V has a relationship of $\Delta\mu/\Delta V<0$. The rotational difference V (rpm) of each of the friction engagement elements 40, 50, 60, 70, and 80 is, for example, a difference in the rotating speed between the inner rotating member 51 with which the high clutch 50 of FIG. 3 engages and the outer rotating member 53.

In the friction engagement element using the friction plates having the μ-V characteristic of the negative slope, the friction coefficient μ increases, for example, as the rotational difference V decreases from a start timing of the engagement of the high clutch 50 (see an arrow P11 in FIG. 10). Therefore, a rapid and instant decrease in the rotational difference V occurs because the decrease in the rotational difference V and the increase in the friction coefficient μ form a positive feedback arrangement and amplify each other. This rapid decrease in the rotational difference V causes a twist or torsion (elastic deformation) in the outer rotating member 53 and the inner rotating member 51 with which the outer friction plate 54 and the inner friction plate 52 engage, respectively, and the metal shaft connected to these members (see FIG. 3). At a moment when the elastic force accumulated in the metal parts by the torsion exceeds a transmission torque capacity which is transmittable by the high clutch 50 (see an arrow P14 in FIG. 10), the high clutch 50 slips all the sudden. That is, the rotational difference of the high clutch 50 increases rapidly (see an arrow P15 in FIG. 10), and the metal shaft, etc. return to their original states where there is no torsion. By repeating this operation, the judder vibration may occur during the engagement process of the high clutch 50 (when transiting from the disengaged state to the engaged state).

On the other hand, in this embodiment, the control device 200 for the friction engagement elements 40, 50, 60, 70, and 80 performs the pushing force control for suppressing the judder vibration during the engagement.

One example of a control operation of the pushing force control executed by the TCM 202 is described with reference to a flowchart illustrated in FIG. 5. Note that, here, a gear change from the third gear to the fourth gear is described as an example.

Figure 5:
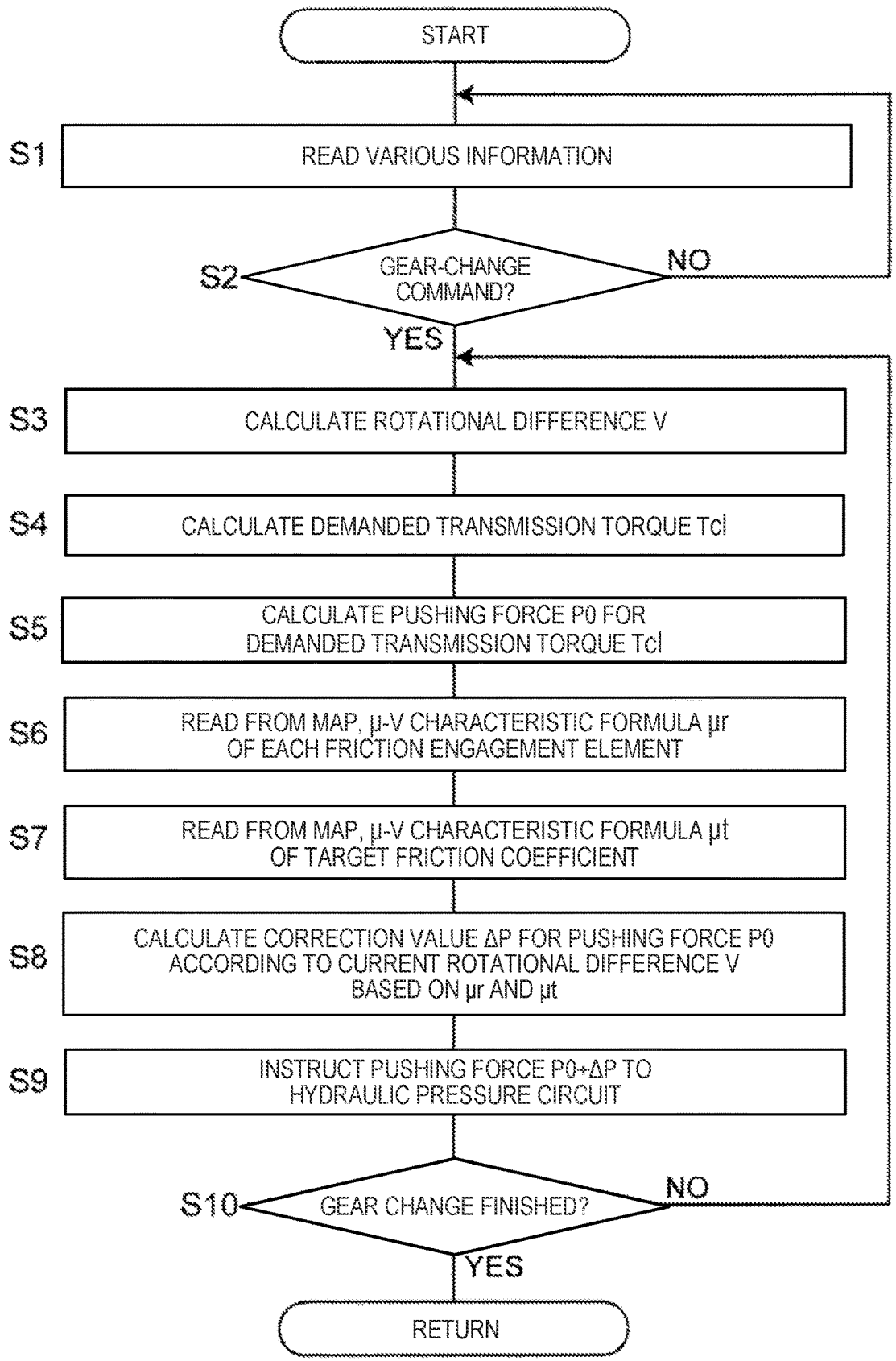
FIG. 5 is a flowchart illustrating a flow of a transmission control operation of the friction engagement element control system.

The control operation illustrated in FIG. 5 is constantly repeated while the transmission control is performed for the vehicle traveling forward.

First, the TCM 202 reads the variety of information at Step S1. At Step S2, the TCM 202 determines whether there is a gear-change command based on the read information. The existence of the gear-change command is determined according to whether the vehicle speed detected by the vehicle speed sensor 212 and the accelerator opening detected by the accelerator opening sensor 210 satisfy the gear-change condition based on the transmission chart stored in a memory of the TCM 202 in advance. At Step S2, if the TCM 202 determines that there is no gear-change command, it returns the flow to Step S1.

If there is the gear-change command at Step S2, the TCM 202 shifts the flow to Step S3, where it detects the rotational difference V In detail, the TCM 202 calculates the rotational difference V of the high clutch 50 which is engaged during the third-to-fourth gear change based on the rotating speed of the input shaft 2 detected by the input-shaft rotating speed sensor 214, the output shaft rotating speed detected by the vehicle speed sensor 212, and a gear ratio of the automatic transmission 1 which is known in advance.

At the next Step S4, the TCM 202 calculates a demanded transmission torque Tcl. In order to calculate the demanded transmission torque Tcl, an engine torque Te is first calculated based on the engine speed detected by the engine speed sensor 211, the accelerator opening detected by the accelerator opening sensor 210, and an engine characteristic map stored in the memory of the TCM 202 in advance, which uses the engine torque, the engine speed, and the accelerator opening as parameters. Then, the demanded transmission torque Tcl required for the high clutch 50 is acquired from the calculated engine torque Te and a gear ratio of the gear stage calculated at Step S2. Note that the method of acquiring the demanded transmission torque Tcl is not limited to the above, and the target demanded transmission torque Tcl may be determined based on various conditions.

At Step S5, the TCM 202 calculates a pushing force P0 according to the demanded transmission torque Tcl acquired at Step S4. In detail, the TCM 202 reads the pushing force P0 according to the demanded transmission torque Tcl from a map of the demanded transmission torque Tcl of each friction engagement element and the pushing force P0, which is provided to the TCM 202 in advance. Note that since the relation between the demanded transmission torque Tcl and the pushing force P0 changes according to the rotational difference and the oil temperature, the map depends on the rotational difference and the oil temperature.

Here, since a μ-V characteristic formula μr of the high clutch 50 has the negative slope, the judder vibration may occur when the high clutch 50 is engaged with the pushing force P0 according to the demanded transmission torque Tcl calculated at Step S5. Here, if a characteristic formula indicative of a relationship between the frictional force F and the rotational difference V, which is obtained by multiplying the friction coefficient μ of the μ-V characteristic formula by the pushing force P0 is referred to as an "F-V characteristic formula," the F-V characteristic formula Fr of the high clutch 50 becomes the negative slope, as illustrated by a broken line in FIG. 6A (e.g., $Fr=(-rV+s)\times P0$).

Next, at Steps S6-S8 in this embodiment, for the purpose of controlling the pushing force so that the F-V characteristic becomes the positive slope even when the μ-V characteristic formula of the friction engagement element has the negative slope, the TCM 202 calculates a correction value ΔP for the pushing force P0.

Figure 6B:
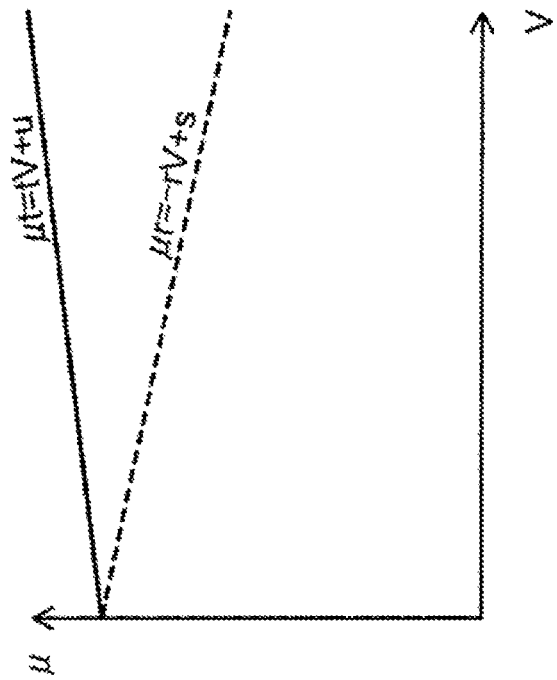
FIG. 6B is a graph illustrating a characteristic (μ-V characteristic) of a friction coefficient relative to the rotational difference (V).
Figure 6A:
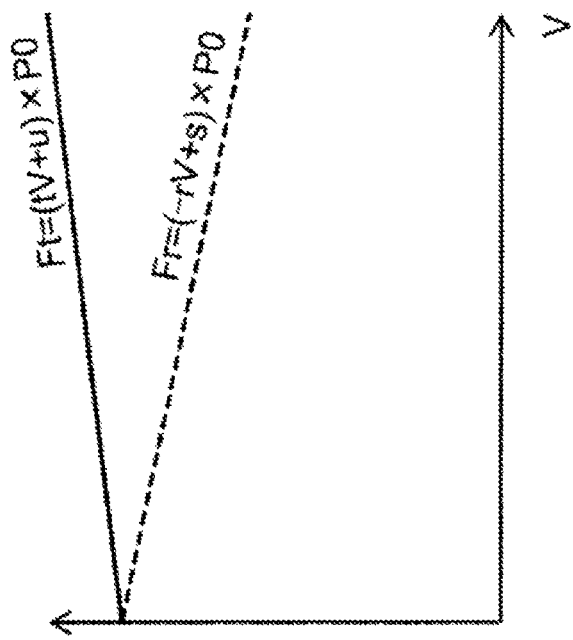
FIG. 6A is a graph illustrating a characteristic (F-V characteristic) of a demanded transmission torque (or a frictional force F) relative to a rotational difference (V)

In the calculation of the correction value ΔP, an F-V characteristic formula Ft of the positive slope to be achieved is illustrated by a solid line in FIG. 6A. Since this F-V characteristic formula Ft is the F-V characteristic formula of the positive slope to be achieved as a target, it is referred to as the "target F-V characteristic formula Ft." Further, a characteristic formula which is made into the dimension of the friction coefficient μ by dividing the target F-V characteristic formula Ft by the pushing force P0 according to the demanded transmission torque Tcl is illustrated by a solid line in FIG. 6B, and it is referred to as the "target μ-V characteristic formula μt." The concrete method of calculating the correction value ΔP of the pushing force P0 and the correction using the correction value ΔP will be described later.

At Step S6, the TCM 202 reads the μ-V characteristic formula μr of the friction coefficient μ relative to the rotational difference V of the high clutch 50 which shifts from the disengaged state to the engaged state in the third-to-fourth gear change. The μ-V characteristic formula μr of the friction coefficient of the high clutch 50 has the μ-V characteristic of the negative slope in which the friction coefficient μ decreases as the rotational difference V increases, for example, as illustrated by the broken line in FIG. 6A. The μ-V characteristic formula μr of the high clutch 50 read at Step S6 may be a linear expression ($\mu r=-rV+s$), for example, relevant to the rotational difference V (here, r and s are constants).

At Step 7, the TCM 202 reads the μ-V characteristic formula μt of the target friction coefficient which is provided to the TCM 202 in advance. The μ-V characteristic formula μt of the target friction coefficient has the μ-V characteristic of the positive slope in which the friction coefficient μ increases as the rotational difference V increases, for example, as illustrated by the solid line in FIG. 6A. The μ-V characteristic formula μt of the target friction coefficient read at Step S5 may be a linear expression ($\mu t=tV+u$), for example, relevant to the rotational difference V (here, t and u are constants).

At Step S8, the TCM 202 calculates the correction value ΔP for the pushing force P0 calculated at Step S5 based on the μ-V characteristic formula μr of the friction coefficient of the high clutch 50 and the μ-V characteristic formula μt of the target friction coefficient, which are read at Steps S6 and S7.

Here, one example of the method of calculating the correction value ΔP for the pushing force P0 is described. Note that since the demanded transmission torque Tcl is a product of the frictional force F of the friction engagement element and a radius of the friction plates, the frictional force F will be described in the following description while the demanded transmission torque Tcl is replaced by the frictional force F.

As the characteristic formula of the frictional force F corresponding to the target demanded transmission torque characteristic Tcl relative to the rotational difference V, it is desirable to have the positive slope in which the frictional force F decreases as the rotational difference V decreases, as illustrated by the solid line in FIG. 6A, in order to suppress the judder vibration.

Therefore, the purpose for correcting the pushing force P0 by the correction value ΔP is to make the F-V characteristic formula of the high clutch 50 into the same characteristic as the target F-V characteristic formula $Ft=(tV+u)\times P0$ of the positive slope as illustrated by the solid line in FIG. 6A. However, if the pushing force P0 is simply multiplied by the μ-V characteristic formula μr of the negative slope of the friction coefficient of the high clutch 50 illustrated by the broken line in FIG. 6B, it becomes the F-V characteristic formula $Fr=(-rV+s)\times P0$ of the negative slope illustrated by the broken line in FIG. 6A. Therefore, by correcting the pushing force P0 of the F-V characteristic formula Fr with ΔP (i.e., by calculating $Fr=(-rV+s)\times(P0+\Delta P)$), the F-V characteristic formula is corrected so that it has the same characteristic as the target F-V characteristic formula $Ft=(tV+u)\times P0$ of the positive slope. In order to calculate ΔP for achieving the correction, ΔP at which $(-rV+s)\times(P0+\Delta P)=(tV+u)\times P0$ is established is to be calculated. That is, the above formula is summarized by ΔP to calculate $\Delta P=((tV+u)/(-rV+s)-1)\times P0$.

Therefore, by adding $\Delta P=((tV+u)/(-rV+s)-1)\times P0$ to the pushing force P0 corresponding to the demanded transmission torque Tcl, the F-V characteristic formula of the high clutch 50 can be corrected to the same characteristic as the target F-V characteristic formula Ft of the positive slope.

At Step S9, the TCM 202 supplies a corrected pushing force P0+ΔP calculated at Step S8 to the high clutch 50.

At Step S10, the TCM 202 determines whether the gear change is finished. At Step S10, if the gear change is finished, the TCM 202 ends this flow. At Step S10, if the gear change is not finished, the TCM 202 returns the flow to Step S3 to repeat the pushing force control. Note that the determination at Step S10 may be based on whether the rotational difference V equals to zero (i.e., V=0).

Although in the above flowchart the high clutch 50 which transitions from the disengaged state to the engaged state in the third-to-fourth gear change is described, a similar control is performed for the friction engagement element which transitions from the disengaged state to the engaged state in other gear-change situations, as needed.

According to the above configuration, by using the friction plates with the high friction coefficient having the μ-V characteristic of the negative slope in which the friction coefficient μ decreases as the rotational difference V increases, the pushing force of each of the friction engagement elements 40, 50, 60, 70, and 80 can be reduced. Therefore, the drive energy for driving the pushing force generation means can be reduced, thereby improving fuel efficiency and downsizing the drive sources (the engine, the motor, etc.).

Since the control device 200 (controller) controls the pushing force of the friction engagement element so as to have the positive-slope characteristic in which the frictional force F decreases as the rotational difference of the friction engagement element decreases when engaging the friction engagement element, the judder vibration can be suppressed even when the friction material of which the μ-V characteristic of the friction coefficient is the negative slope is used.

As described above, in the friction engagement element control system, both the improvement in fuel efficiency by the reduction of the pushing force of the friction engagement element and the reduction of the judder vibration can be achieved.

Moreover, as described above, since the actuation system has the configuration of the friction engagement element provided with the control valve which controls the hydraulic pressure supplied to the piston from the oil pump, both the improvement in fuel efficiency by the reduction of the pushing force of the friction engagement element and the reduction of judder vibration can be achieved, without changing the configuration of the friction engagement element of a conventional automatic transmission.

Moreover, as described above, the rotational difference V of the friction engagement element 50 is calculated based on the rotating speeds of the input shaft 2 as the input member of the automatic transmission 1 and the output member 4 of the automatic transmission 1, and the gear ratio of the friction engagement element 50. Therefore, it is not necessary, for obtaining the rotational difference V, to be provided with a sensor for detecting a rotating speed of each of the inner friction plates 52, and the outer friction plates 54 of each friction engagement element 50 (or the inner and outer rotating members 51 and 53 with which both the friction plates engage).

Moreover, as described above, since the control device (controller) 200 corrects the pushing force for controlling the engaging force (frictional force) F according to the rotational difference V, it can control the engaging force (frictional force) F relative to the rotational difference V so as to become the positive slope.

Moreover, as described above, since the control device (controller) 200 performs the control during a period from the engagement start of the friction engagement element 50 to the completion of engagement, the judder vibration during the transition from the disengaged state to the engaged state can be suppressed effectively.

Figure 7A:
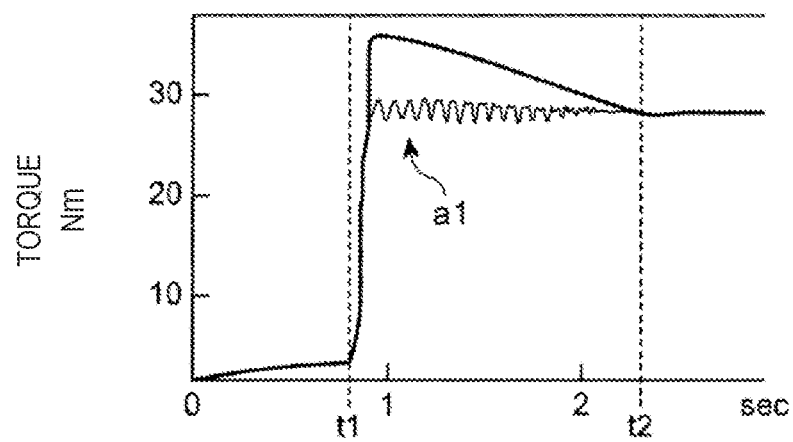
FIGS. 7A to 7C illustrate a simulation result of a transmission control operation of the friction engagement element control system.
Figure 7B:
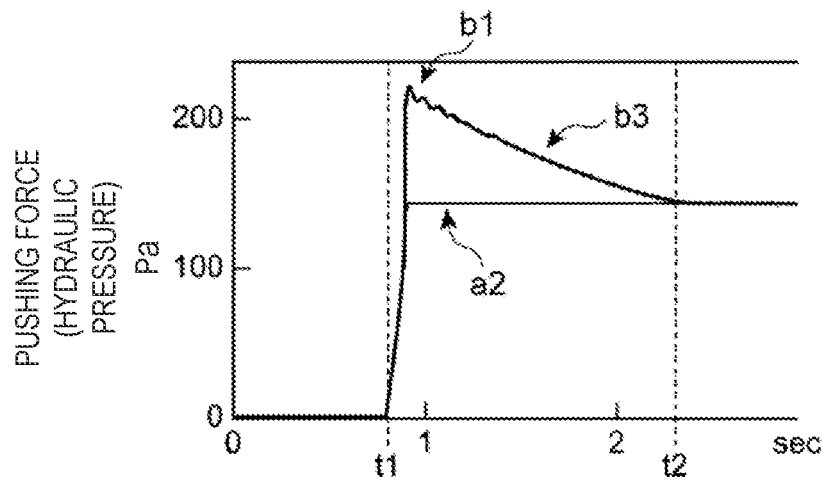
Figure 7C:
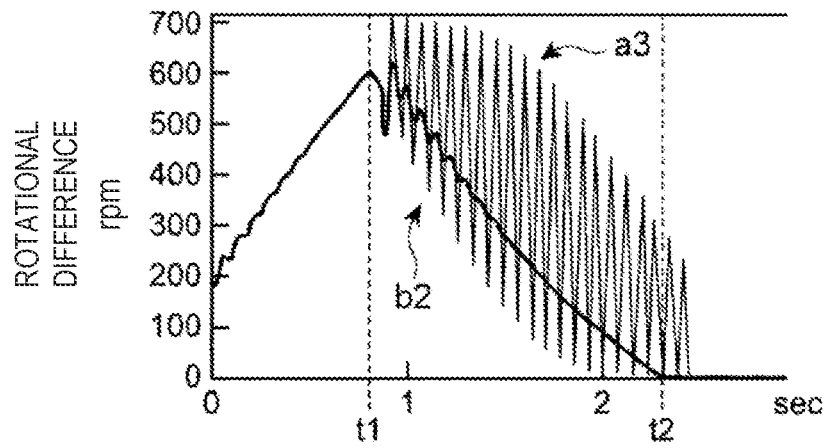

As illustrated in FIGS. 7A to 7C, according to the pushing force control by the above configuration, it is confirmed by computer simulation that the judder vibration during the engagement of the friction engagement element having the μ-V characteristic of the negative slope is suppressed.

FIGS. 7A to 7C illustrate a case where the friction engagement element having the μ-V characteristic of the negative slope transitions from the disengaged state to the engaged state, where FIG. 7A illustrates a temporal change in the torque of the friction engagement element, FIG. 7B illustrates a temporal change in the pushing force of the friction engagement element, and FIG. 7C illustrates a temporal change in the engine speed of the friction engagement element. In FIGS. 7A to 7C, the thick line indicates a simulation result when the pushing force control is carried out, and the thin line indicates a simulation result when the pushing force control is not carried out.

When not carrying out the pushing force control, the pushing force P is raised to a given value according to the demanded transmission torque (an arrow a1) at a gear-change command timing (engagement start timing) t1 and is then controlled at a constant value (an arrow a2). In this case, while transitioning from the engagement start timing t1 to an engagement completion timing t2, the judder vibration occurs (an arrow a3).

On the other hand, when the pushing force control is carried out, as illustrated by an arrow b1, the pushing force P is raised to a value which is obtained by correcting the given value P according to the demanded transmission torque (the arrow a1) by the correction value ΔP according to the rotational difference V at the gear-change command timing t1. Then, the pushing force control for reducing the correction value ΔP of the pushing force P is performed as the rotational difference V of an arrow b2 decreases (an arrow b3). Therefore, as illustrated in FIG. 7C, the judder vibration which is caused while transiting from the engagement start timing t1 to the engagement completion timing t2 is suppressed.

Note that although in this simulation 600 rpm which is a typical rotational difference at a gear change by one gear stage is used as one example of the initial value, the judder vibration can also be suppressed by a similar pushing force control at other speeds.

The present disclosure is not limited to the illustrated embodiment, and various improvements and design alterations are possible without departing from the spirit of the present disclosure.

Figure 8:
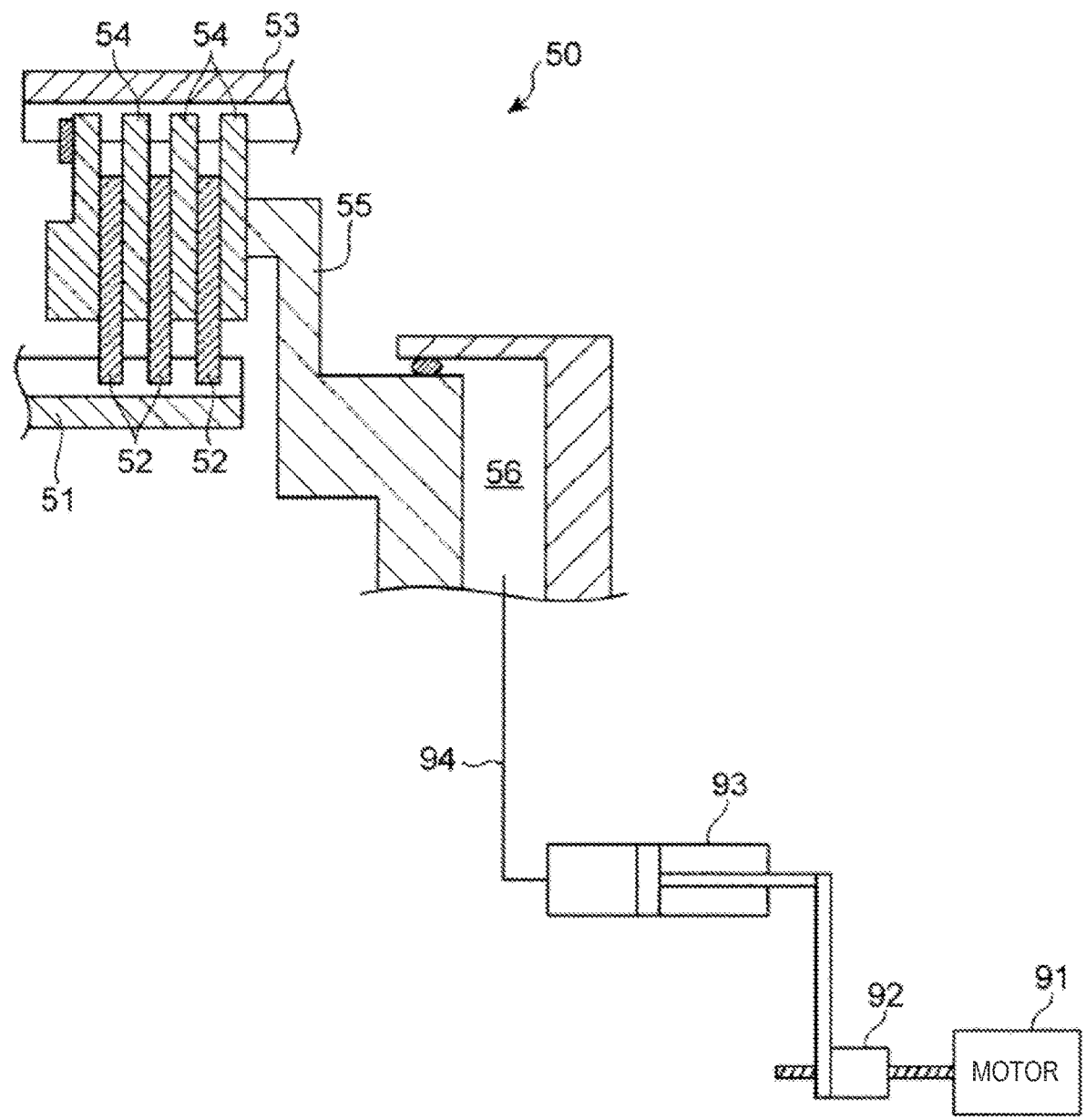
FIG. 8 is a view illustrating a modification of an actuation system.
Figure 9:
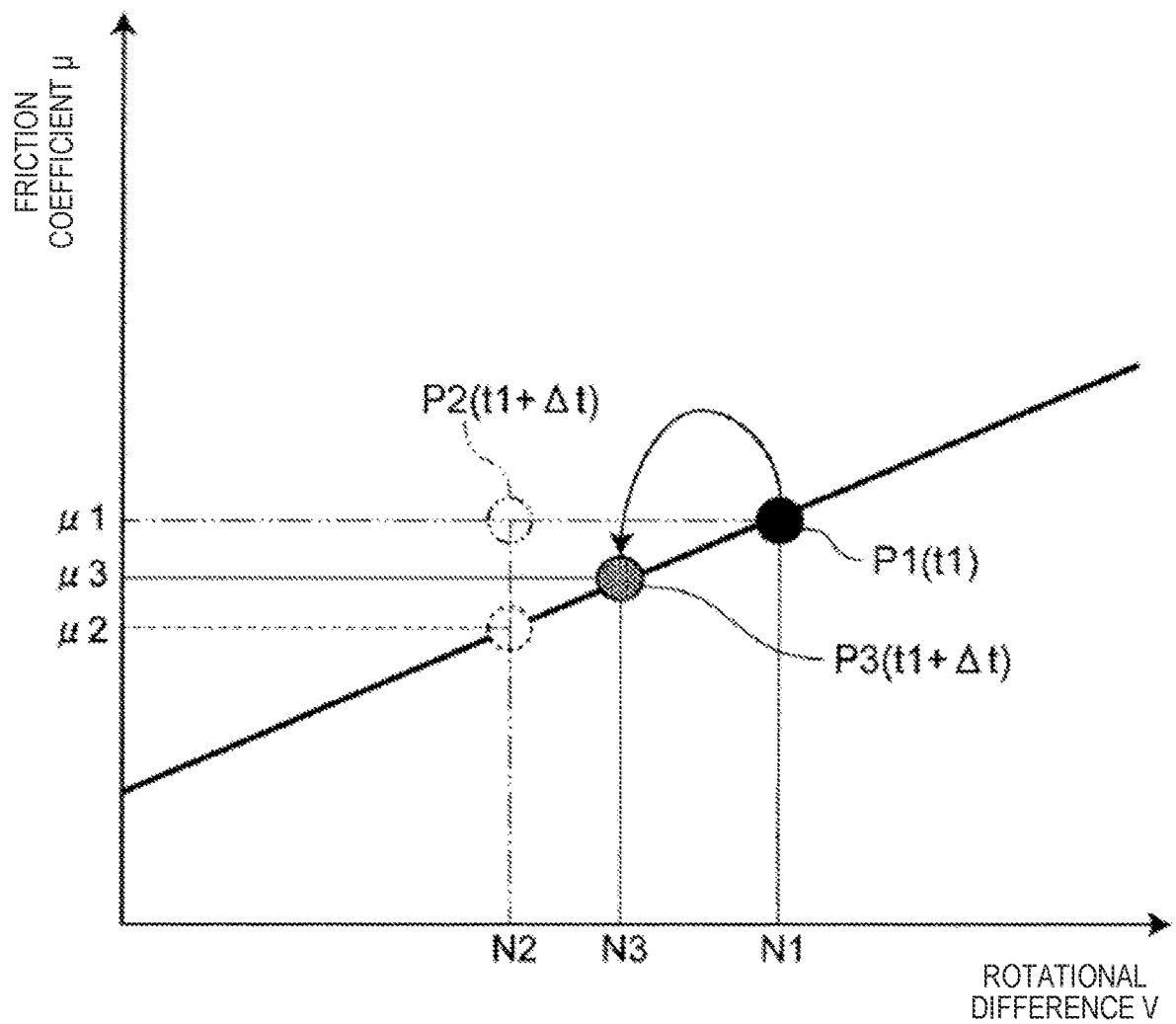
FIG. 9 is a graph illustrating a phenomenon when engaging the friction engagement elements of the μ-V characteristic of a positive slope.

For example, although the actuation system is provided with the piston 55, the oil pump 62, and the solenoid valve 101 which controls the hydraulic pressure supplied from the oil pump 62 to the piston 55, it may be a so-called "electrohydraulic clutch actuator" in which the piston 55 and a hydraulic cylinder 93 which supplies the hydraulic pressure to the piston 55 are operated by an electric motor 91, as illustrated in FIG. 8.

In detail, the electrohydraulic clutch actuator type piston includes the piston 55, the motor 91, a converter 92 which converts a rotational motion of the motor 91 into a linear motion, the hydraulic cylinder 93, and an oil passage 94 which connects the hydraulic cylinder 93 with the hydraulic pressure chamber 56 of the friction engagement element 50.

The electrohydraulic clutch actuator type piston drives the motor 91 to linearly move the converter 92 and the piston 95 of the hydraulic cylinder 93 connected to the converter 92. Therefore, the hydraulic fluid of the hydraulic cylinder 93 is supplied to the hydraulic pressure chamber 56 of the friction engagement element via the oil passage 94, and the piston 55 presses the friction plates 52 and 54.

According to the above configuration, for example, the speed of response of the friction engagement element can be improved as compared with the case where the oil is supplied from the oil pan by the oil pump. For example, since the frequency of the judder vibration is about 10 Hz to about 20 Hz (see the arrow a3 in FIG. 7C), by setting the speed of response as 100 Hz or higher, the pushing force control can be performed at a sufficiently higher speed of response than the frequency of the judder vibration. Therefore, the judder vibration may be suppressed more effectively.

Note that the speed of response may be a period of time after the actuation system receives a given hydraulic pressure supply command from the control device until the hydraulic pressure is controlled to reach the given value and the piston presses the friction plates.

Moreover, although the control device for the friction engagement element is mounted on the automatic transmission, the friction engagement element may be an electromagnetic clutch used for 4WD and provided with an electromagnetic actuation system.

As described above, according to the present disclosure, since both the improvement in fuel efficiency by the reduction of the pushing force of the friction engagement element and the reduction of judder vibration can be achieved in the control device for the friction engagement element, it may be suitably utilized in the manufacturing industry field of the friction engagement elements.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automatic Transmission
2 Input Shaft (Input Member of Automatic Transmission)
4 Output Gear (Output Member of Automatic Transmission)
50 Friction Engagement Element
52 Inner Friction Plate (Output-side Friction Plate)
54 Outer Friction Plate (Input-side Friction Plate)
55 Piston
62 Oil Pump
91 Electric Motor
93 Hydraulic Cylinder
101 Solenoid Valve (Control Valve)
200 Control Device (Controller)
212 Output-Shaft Rotating Speed Sensor (Vehicle Speed Sensor)
214 Input-Shaft Rotating Speed Sensor

What is claimed is:
1. A friction engagement element control system, comprising:
a friction engagement element including friction plates, which are an input-side friction plate and an output-side friction plate, and an actuation system configured to engage the input-side friction plate with the output-side friction plate with a pushing force, a characteristic formula defining a friction coefficient between the friction plates that decreases as a rotational difference between the friction plates increases; and
a controller configured to:
calculate the rotational difference between the friction plates;
calculate a demanded transmission torque;

calculate the pushing force based on the calculated rotational difference and the demanded transmission torque, such that a frictional force of the friction engagement element is controlled to decrease as the rotational difference decreases; and supply the pushing force to the friction engagement element.

2. The friction engagement element control system of claim 1, wherein the actuation system includes a piston, an oil pump, and a control valve configured to control hydraulic pressure supplied to the piston from the oil pump.

3. The friction engagement element control system of claim 2, wherein the friction engagement element control system constitutes an automatic transmission, wherein the automatic transmission includes an input member coupled to the input-side friction plate, an output member coupled to the output-side friction plate, an input rotating speed sensor configured to detect an input rotating speed of the input member, and an output rotating speed sensor configured to detect an output rotating speed of the output member, and wherein the controller calculates the rotational difference by converting the input rotating speed detected by the input rotating speed sensor and the output rotating speed detected by the output rotating speed sensor.

4. The friction engagement element control system of claim 3, wherein the controller corrects the pushing force according to the rotational difference.

5. The friction engagement element control system of claim 4, wherein the controller controls the pushing force from a start of the engagement of the friction engagement element to an end of the engagement.

6. The friction engagement element control system of claim 3, wherein the controller controls the pushing force from a start of the engagement of the friction engagement element to an end of the engagement.

7. The friction engagement element control system of claim 1, wherein the actuation system includes a piston, a hydraulic cylinder configured to supply hydraulic pressure to the piston, and an electric motor configured to operate the hydraulic cylinder.

8. The friction engagement element control system of claim 7, wherein the controller controls the pushing force from a start of the engagement of the friction engagement element to an end of the engagement.

9. The friction engagement element control system of claim 1, wherein the friction engagement element control system constitutes an automatic transmission, wherein the automatic transmission includes an input member coupled to the input-side friction plate, an output member coupled to the output-side friction plate, an input rotating speed sensor configured to detect an input rotating speed of the input member, and an output rotating speed sensor configured to detect an output rotating speed of the output member, and wherein the controller calculates the rotational difference by converting the input rotating speed detected by the input rotating speed sensor and the output rotating speed detected by the output rotating speed sensor.

10. The friction engagement element control system of claim 9, wherein the controller corrects the pushing force according to the rotational difference.

11. The friction engagement element control system of claim 9, wherein the controller controls the pushing force from a start of the engagement of the friction engagement element to an end of the engagement.

12. The friction engagement element control system of claim 1, wherein the controller corrects the pushing force according to the rotational difference.

13. The friction engagement element control system of claim 1, wherein the controller controls the pushing force from a start of the engagement of the friction engagement element to an end of the engagement.

14. The friction engagement element control system of claim 1, wherein the pushing force is calculated based on the demanded transmission torque and the characteristic formula so that a frictional force characteristic formula defining the frictional force of the friction engagement element between the friction plates is changed from a linear expression having a negative slope to a linear expression having a positive slope in which the frictional force of the friction engagement element decreases as the rotational difference decreases.

15. The friction engagement element control system of claim 1, wherein the controller is configured to control the pushing force of the friction engagement element so as to have a positive slope characteristic in which the frictional force decreases as the rotational difference of the friction engagement element decreases when engaging the friction engagement element.

16. The friction engagement element control system of claim 1, wherein
the characteristic formula is a first characteristic formula; and
the pushing force is calculated using a second characteristic formula defining a relationship between the frictional force and the rotational difference, the relationship having a positive slope in which the frictional force decreases as the rotational difference decreases.

17. The friction engagement element control system of claim 1, wherein the controller is configured to calculate the pushing force by:
calculating the pushing force based on the calculated demanded transmission torque;
reading the characteristic formula which is a first linear expression having a negative slope between the friction coefficient and the calculated rotational difference, in which the friction coefficient decreases as the calculated rotational difference increases;
reading a second linear expression having a positive slope between a target friction coefficient and the calculated rotational difference, in which the target friction coefficient increases as the calculated rotational difference increases;
calculating a pushing force correction value for the pushing force based on the calculated rotational difference, the first linear expression, and the second linear expression; and
correcting the pushing force by the pushing force correction value.

18. The friction engagement element control system of claim 17, wherein the controller calculates the pushing force correction value according to a formula=$((tV+u)/(-rV+s)-1) \times P0$, wherein
$V$ is the calculated rotational difference;
$P0$ is the pushing force;
$-rV+s$ is the first linear expression having the negative slope between the friction coefficient and the calculated rotational difference; and
$tV+u$ is the second linear expression having the positive slope between the target friction coefficient and the calculated rotational difference, with a positive slope.

19. A method of controlling a friction engagement element including friction plates, which are an input-side friction plate and an output-side friction plate, and an actuation system configured to engage the input-side friction plate with the output-side friction plate with a pushing force, a characteristic formula defining a friction coefficient between the friction plates being a linear function having a negative slope in which the friction coefficient thereof decreases as a rotational difference between the friction plates increases, the method comprising:
- calculating the rotational difference between the friction plates;
- calculating a demanded transmission torque;
- determining that the friction engagement element is being engaged;
- responsive to determining that the friction engagement element is being engaged, calculating the pushing force based on the calculated rotational difference and the demanded transmission torque, such that a frictional force of the friction engagement element is controlled to decrease as the rotational difference decreases; and
- supplying the pushing force to the friction engagement element.

20. The method of claim 19, wherein the pushing force is calculated based on the demanded transmission torque and the characteristic formula so that a frictional force characteristic formula defining the frictional force of the friction engagement element between the friction plates is changed from a linear expression having a negative slope to a linear expression having a positive slope in which the frictional force of the friction engagement element decreases as the rotational difference decreases.

* * * * *